United States Patent
Schwarz et al.

(10) Patent No.: US 6,561,584 B1
(45) Date of Patent: May 13, 2003

(54) DEVICE FOR BLOCKING A CATCH DEVICE FOR MOTOR VEHICLE BACKRESTS, WHOSE INCLINATION MAY BE ADJUSTED

(75) Inventors: Tobias Schwarz, Budenheim (DE); Jürgen Andres, Impflingen (DE)

(73) Assignee: Faurocia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/607,948

(22) Filed: Jun. 30, 2000

(30) Foreign Application Priority Data

Jul. 1, 1999 (DE) .......................... 199 30 363

(51) Int. Cl.$^7$ ................................. B60N 2/20
(52) U.S. Cl. .................. 297/367; 297/379; 297/378.11
(58) Field of Search ................. 297/367, 368, 297/362, 361.1, 362.12, 378.11, 378.12, 379

(56) References Cited

U.S. PATENT DOCUMENTS

| | | | | |
|---|---|---|---|---|
| 4,225,177 A | * | 9/1980 | Kliiting ....................... 297/379 |
| 4,294,488 A | * | 10/1981 | Pickles ....................... 297/367 |
| 4,295,682 A | * | 10/1981 | Kluting et al. ............... 297/367 |
| 4,497,518 A | * | 2/1985 | Nishimura et al. .......... 297/341 |
| 4,634,182 A | * | 1/1987 | Tanaka ........................ 297/379 |
| 4,707,010 A | * | 11/1987 | Croft et al. .................. 297/379 |
| 4,733,912 A | * | 3/1988 | Secord ........................ 297/379 |
| 4,795,213 A | * | 1/1989 | Bell ............................ 297/367 |
| 5,163,735 A | * | 11/1992 | Aljundi ....................... 297/378 |
| 5,558,403 A | * | 9/1996 | Hammoud et al. ..... 297/378.12 |
| 5,733,008 A | * | 3/1998 | Tame .................... 297/378.11 |
| 6,250,705 B1 | * | 6/2001 | Zuch ................. 297/216.16 X |

FOREIGN PATENT DOCUMENTS

| | | | |
|---|---|---|---|
| DE | 197 3 646 A1 | | 1/1999 |
| DE | 10001329 | * | 7/2001 |
| EP | 0 788 923 A1 | | 8/1997 |
| WO | WO98/35850 | * | 8/1998 |

* cited by examiner

Primary Examiner—Lanna Mai
Assistant Examiner—Winnie Yip
(74) Attorney, Agent, or Firm—Connolly Bove Lodge & Hutz LLP

(57) ABSTRACT

A device for the blocking of a catch adjustment device for motor vehicle backrests, with adjustable inclination, that are articulated at a seat portion, the catch adjustment device having a catch gear toothing a catch element that may be brought into engagement therewith in various positions of inclination. When the inclination is being adjusted, the catch member lies out of engagement. The device comprises a control element that is sensitive to inertia, and which triggers blocking of the backrest when the catch lock is released. The control element, which is sensitive to inertia, affects a blocking device that can be activated pyrotechnically, and is provided between an area that is firmly attached to the seat and an area firmly attached to the backrest.

16 Claims, 6 Drawing Sheets

DEVICE FOR BLOCKING A CATCH DEVICE FOR MOTOR VEHICLE BACKRESTS, WHOSE INCLINATION MAY BE ADJUSTED

TECHNICAL FIELD

The invention relates to a catch device for securing the passenger seat back of auto mobile seats, and more particularly, to an inertia-driven device for securing the passenger seat back in the event of a collision.

BACKGROUND OF INVENTION

In order to facilitate passenger comfort in an automobile, it is desirable that the degree of inclination of the passenger seat back be adjustable. However, during a collision, the position of the back rest must be fixed in order to decrease the incidence and severity of whiplash injuries to the occupants. According to a prior art device (WO 98/35 850), a head restraint is fixed by an unlockable catch device. This catch device is capable of being unlocked by an adjustment mechanism. In the event of a collision, even in the case that the catch device has been unlocked by operation of the adjustment mechanism, an inertia-sensitive element slews the catch element into engagement with the catch-gear teeth of the catch device. This solution suffers from the fact that the spring that forces the catch member to engage the catch teeth must be designed to be comparatively weak so that passengers may normally easily operate the adjustment mechanism.

SUMMARY OF THE INVENTION

Taking the state of the art as a point of departure, it is an object of the present invention to create a blocking device that is quick to react and secure the catch device of a backrest, the inclination of which is adjustable.

This object is accomplished using a locking bolt attached to the seat, the bolt having a retracted position and an extended position, and having an axis coincident with the direction of bolt movement and parallel to the axis of rotation; an opposing member affixed to the seat back, the opposing member having a blocking opening disposed to receive the lock bolt when the lock bolt is in the extended position; an abutting piece affixed to the seat and having an acceptance opening, wherein the locking bolt, blocking opening, and acceptance opening are disposed coaxially, and wherein when the locking bolt is in the extended position a portion of the bolt passes through the blocking opening and thence into the acceptance opening.

This basic locking mechanism is augmented with an inertial sensitive means for extending the bolt through the blocking opening and thence into the acceptance opening. The inertial sensor may be the same means provided for deploying the airbags in the event of a collision. The means for deploying the locking bolt is a pyrotechnic device which may be similar to the pyrotechnic used to inflate the airbags in response to the inertial sensing means detecting a sudden deceleration greater than a predetermined magnitude. Functionally, pyrotechnics provide extremely rapid and certain deployment. Moreover, their safety in an automotive environment is established by the many years of service as the means of inflating airbags.

In addition means are provided for determining whether seat back is locked wherein the determining means prevent bolt-extending means from operating unless seatback is unlocked.

DETAILED DESCRIPTION OF THE PREFERRED EMBODIMENTS

Figure 1:
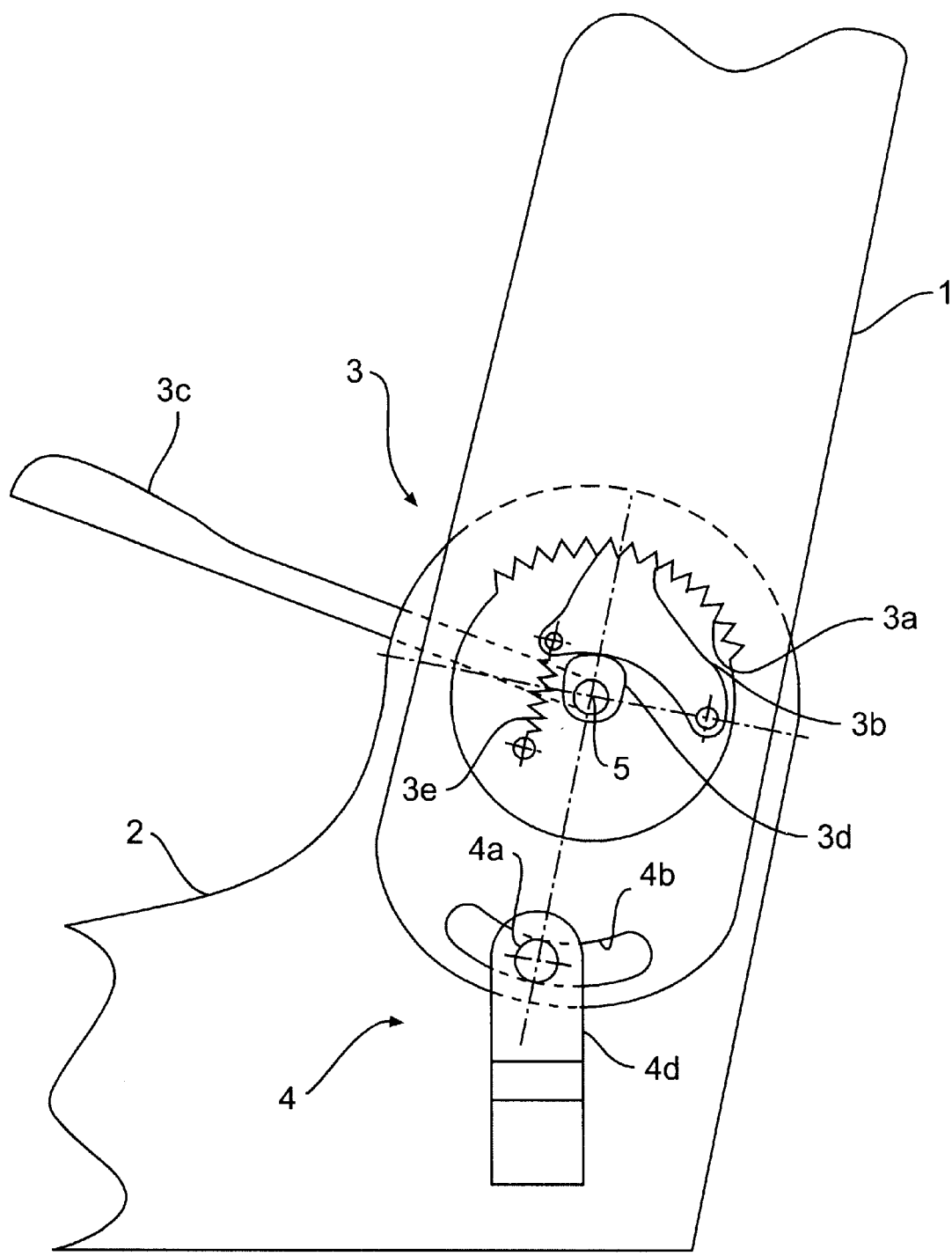
FIG. 1 shows a schematic side view of the area of the inclination adjustment of a backrest and a portion of a motor vehicle seat in an initial embodiment form.
Figure 2:
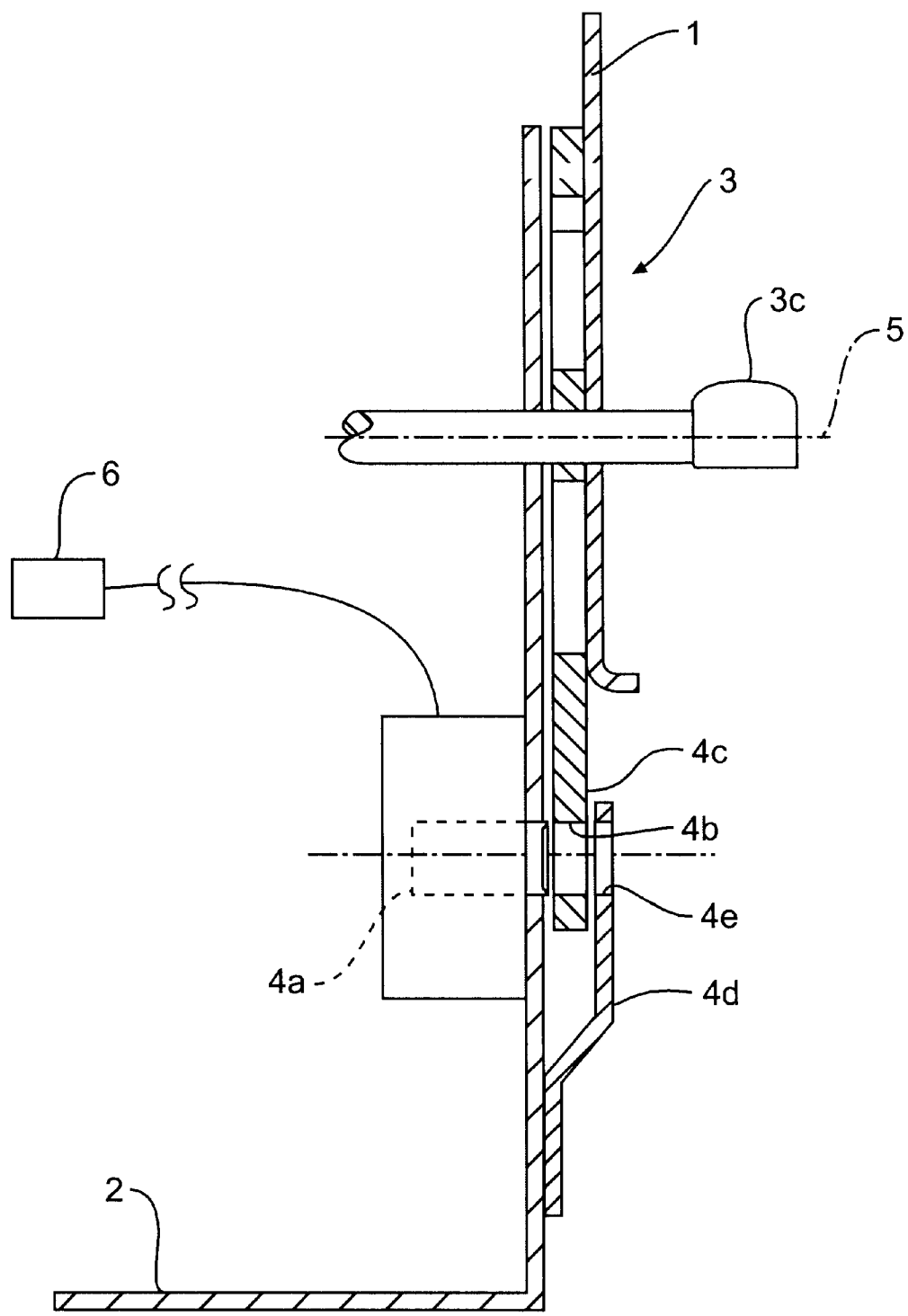
FIG. 2 shows a section of the backrest that runs in the longitudinal direction through the motor vehicle seat's axis of inclination according to FIG. 1, in the unblocked state.

In the drawings, identical parts are provided the identical reference symbol, if necessary, distinguished by prime marks.

A backrest 1 of a motor vehicle seat is connected with a seat portion 2 in articulated fashion. The backrest 1 can be pivoted around an axis of inclination into various positions of inclination. It is locked in the position that was selected by a catch adjustment device 3. To this end, a sheet metal flange of the backrest 1 exhibits internal gear toothing, which serves as catch gear toothing 3a into which the toothed segment of a catch member 3b meshes. The catch member 3b is seated on seat portion 2 so as to pivot, and, by means of a spring 3e it is slewed out of engagement with the catch gear toothing 3a. A clamping piece 3d, which is turned by an activation lever 3c, holds the catch member 3b against the catch gear toothing 3a against the elastic force.

Beneath the catch adjustment device 3, in a first embodiment form, a blocking device 4 is provided on the motor vehicle seat. The sheet metal flange, which bears the catch gear teeth 3a, which is firmly connected to the backrest 1, serves as the opposing piece 4c for a locking bolt 4a of the blocking device. The opposing piece 4c exhibits a blocking opening 4b. The blocking opening 4b into which the locking bolt 4a can fall in any inclination of the backrest 1 that lends itself to the driving of the motor vehicle, runs in the form of an arc around the axis of inclination 5.

The locking bolt 4a is seated on seat portion 2. The axis of the locking bolt 4a, which coincides with its direction of movement, runs parallel to the axis of inclination 5. An abutting piece 4d, which partially surrounds and grips the opposing piece 4c is welded on at the seat portion 2. The abutting piece 4d bears an acceptance opening 4e that is flush with the locking bolt 4a.

Figure 3:
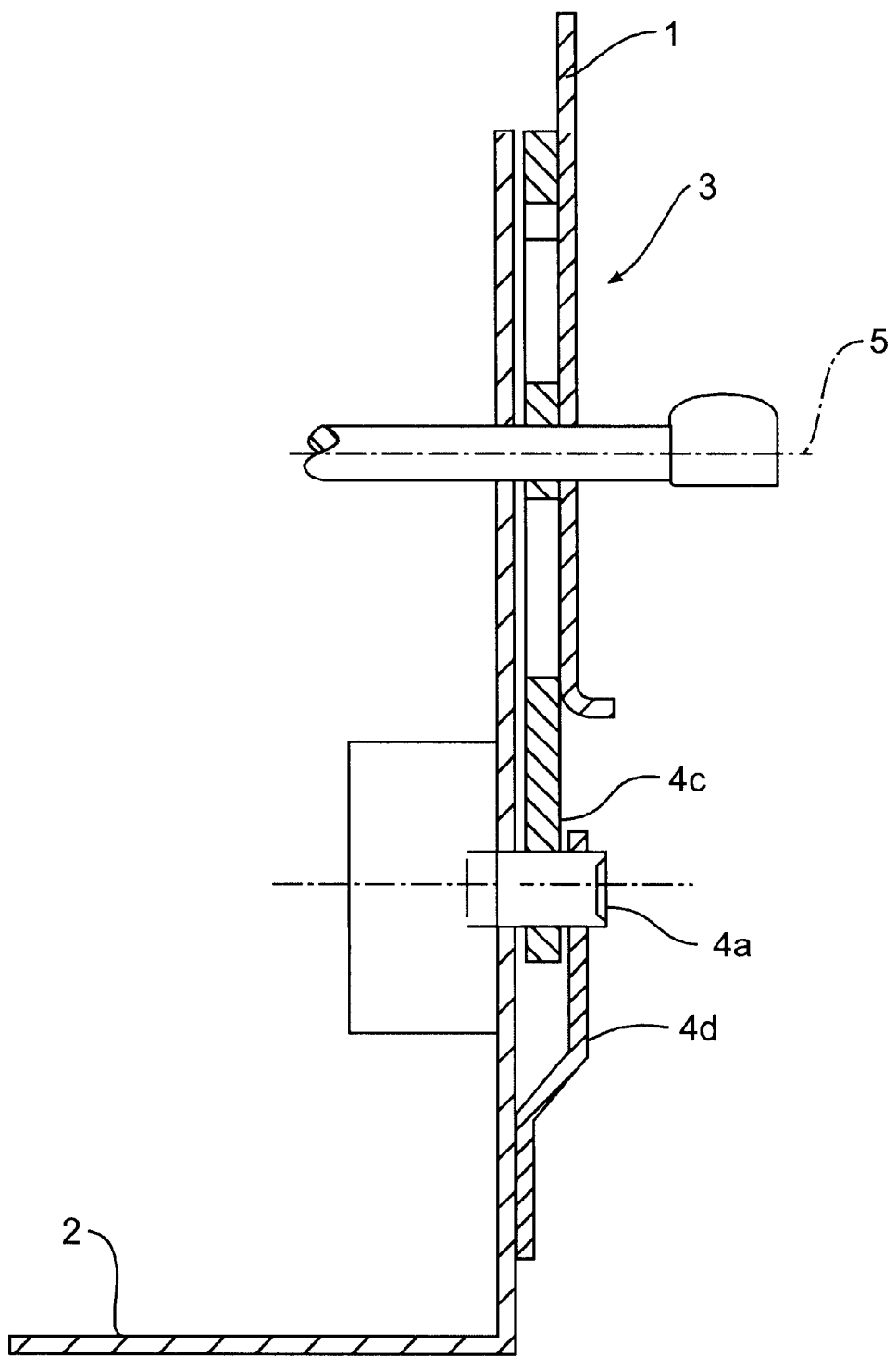
FIG. 3 shows a section, according to FIG. 2, with blocked inclination of the rest.

The propulsion device for the locking bolt is not depicted. The inertia-sensitive control element 6 for triggering the shift of the locking bolt 4a can be provided at any random point in the motor vehicle a control element that is needed for other pyrotechnic applications can be used as well. Propulsion of the locking bolt 4a works only if the catch device 3 is released. In the blocked position of backrest 1 depicted in FIG. 3, the locking bolt 4a is supported on the one hand in a portion of the frame of the seat portion 2 and, on the other hand, in the abutting piece 4d. The backrest 1 can pivot, maximally, until it makes contact with the posterior end of the blocking opening 4b on the locking bolt 4a.

Figure 4:
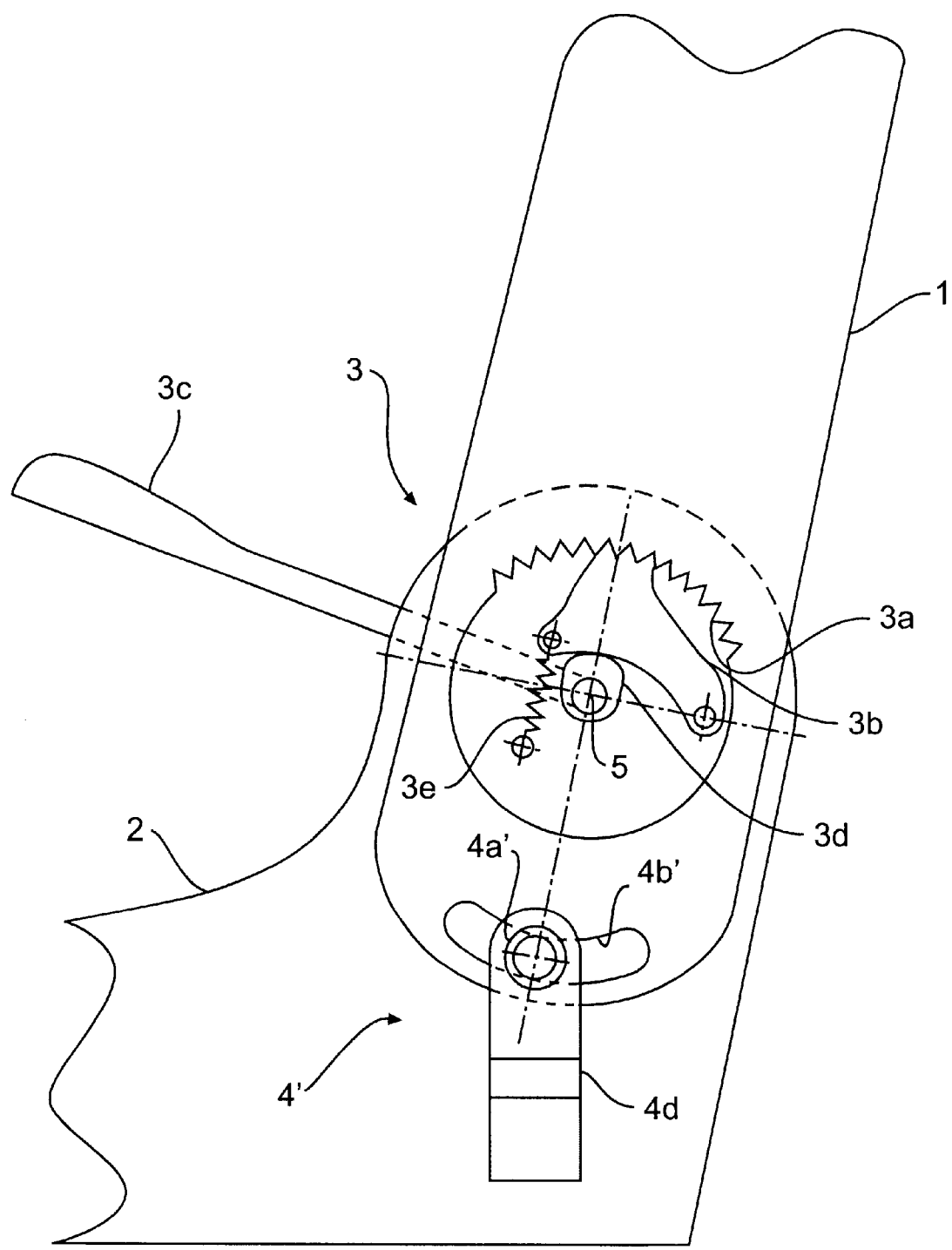
FIG. 4 shows a view of a second embodiment form of a motor vehicle seat that corresponds to FIG. 1.
Figure 5:
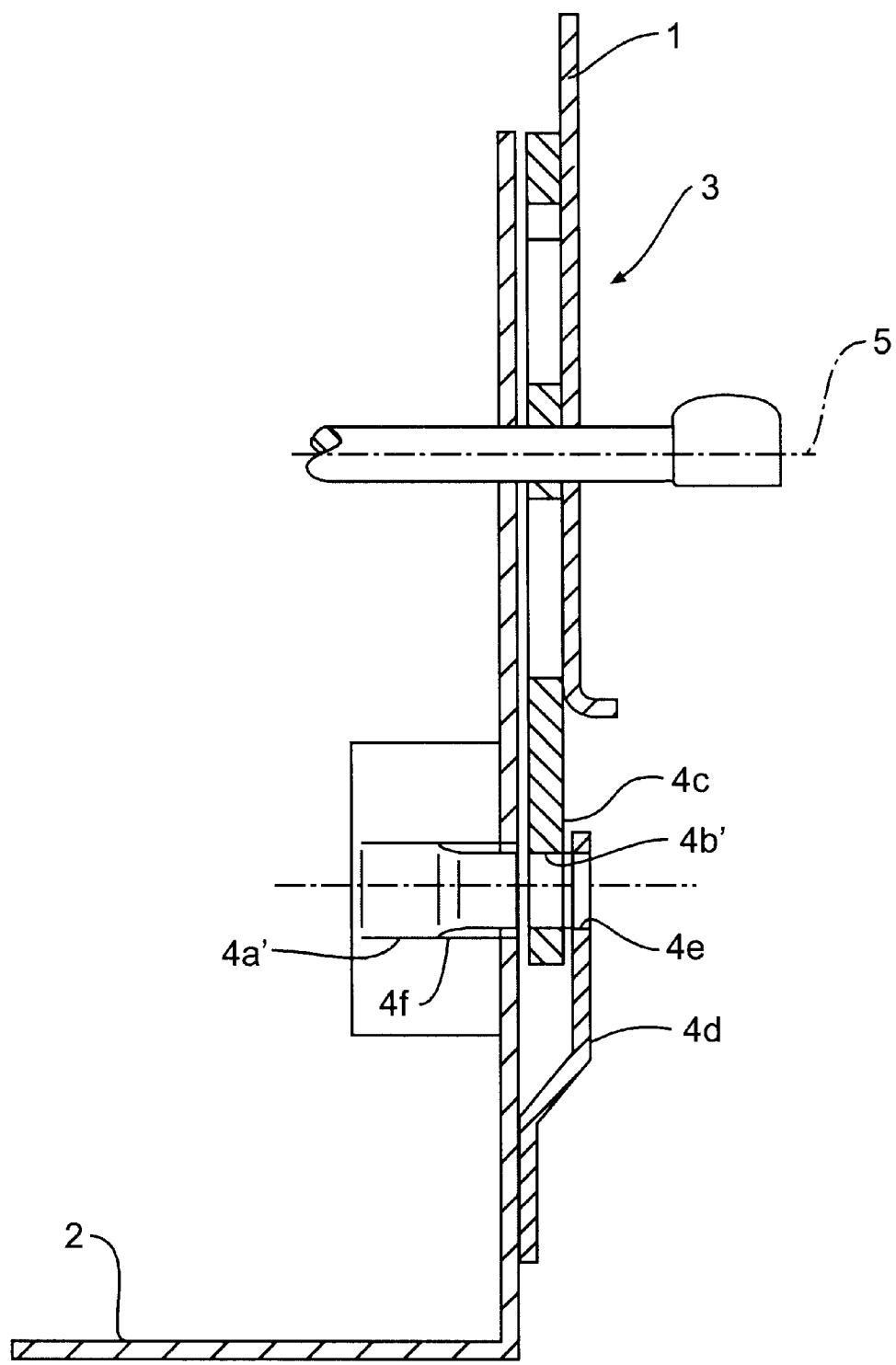
FIG. 5 shows a representation of the motor vehicle seat according to FIG. 4 that corresponds to FIG. 2.
Figure 6:
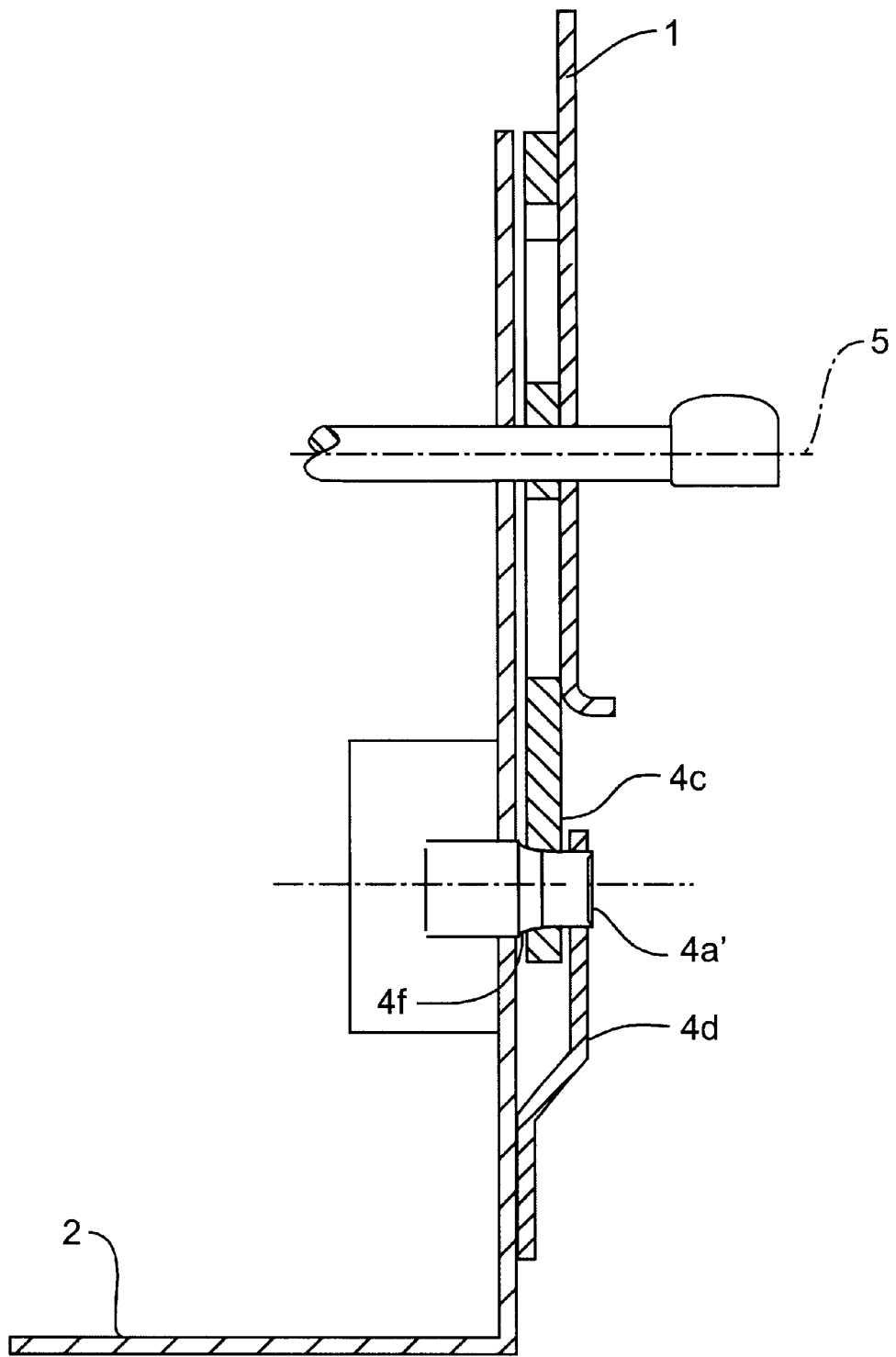
FIG. 6 shows a representation of the motor vehicle seat according to FIG. 4 that corresponds to FIG. 3.

The second embodiment form of the invention, which is depicted in FIGS. 4 through 6 differs from the first only by virtue of the fact that the blocking device 4' is operated with a changed locking bolt 4a'. Between the portion of the locking bolt 4a' that is seated in the seat portion 2 and the area that engages the blocking opening 4b', a conical area 4f is provided, which positions itself against the blocking opening when the locking bolt 4a' is shifted into the blocking position at the edge of the blocking opening 4b', which is turned toward the seat portion 2. The conical area 4f brakes the motion of the backrest 1, as it is pivoted into the final position, which is prescribed by the blocking opening 4b'. The blocking opening 4b' can exhibit a phase that corresponds to the conical area 4f.

One object of the present invention is that the locking bolt is deployed only under circumstances where the seatback catch device is in its unlocked state. The invention provides a means of determining whether the seatback is locked.

In one embodiment, the locking bolt maintains a substantially circular cross-section throughout substantially its entire length. In this embodiment, the motion of the seatback is subject to sudden deceleration as the end of the blocking opening engages the blocking bolt. In a second embodiment, the distal end of the bolt, the end that passes through the blocking opening, is substantially conic in shape and has a taper. In that embodiment, the blocking opening has a complementary taper. When the blocking bolt is fired, it comes to rest wedged against the edges of the blocking opening. As a consequence, the seatback is gradually decelerated to a stop.

What is claimed is:

1. A device for blocking a catch adjustment device for a motor vehicle backrest having adjustable inclination and being attached in articulated fashion to a seat portion, wherein the catch adjustment device includes catch gear teeth and a catch element that engage in varied positions of inclination and does not engage as the inclination is adjusted, the device comprising a blocking device, wherein the blocking device includes a locking bolt capable of sliding through a blocking opening of an opposing piece connected to the backrest, the locking bolt having a retracted position and an extended position, and an inertia sensitive control that triggers the locking bolt, the blocking opening receives the locking bolt in the extended position to secure the catch adjustment device.

2. A device for blocking a catch adjustment device according to claim 1, wherein the locking bolt is attached to the seat portion, and the opposing piece is attached to the backrest.

3. A device for blocking a catch device according to claim 1, wherein the locking bolt, in the extended position is disposed in the blocking opening of the opposing piece and in an acceptance opening of an abutting piece that is firmly connected to the seat portion.

4. A device for blocking a catch device according to claim 1, wherein the opposing piece is a flange firmly attached to the backrest disposed between the locking bolt in an unreleased state and an abutting piece mounted on the seat portion, wherein the abutting piece has an acceptance opening which the bolt passes through in the extended position.

5. Device for blocking a catch device according to claim 1, wherein the blocking opening forms an arc.

6. A device for blocking a catch device according to claim 1, wherein the locking bolt includes a conical area that rests against the edge of the blocking opening in the extended position.

7. A device for blocking a catch device according to claim 1, wherein the blocking opening is conical.

8. A device for locking a motor vehicle seat, the seat having a seat back pivotably connected to the seat to provide a functional range of inclination, the device comprising:

a locking bolt attached to the seat, the locking bolt having a retracted position and an extended position;

an opposing member affixed to the seat back, the opposing member having a blocking opening disposed to receive the locking bolt in the extended position; and an abutting piece affixed to the seat and having an acceptance opening, wherein the locking bolt passes through the blocking opening and the acceptance opening in the extended position to secure the catch adjustment device.

9. A device, according to claim 8, said blocking opening extends across the entire functional range of inclination used during driving.

10. A device, according to claim 8, wherein said opposing piece comprises a flange, slidably disposed between said locking bolt and said abutting piece, wherein said flange, traverses an arc between said locking bolt and said abutting piece with the locking bolt in the retracted position.

11. A device, according to claim 8, wherein said blocking opening is an arc radially disposed about the catch adjustment device.

12. A device, according to claim 8, wherein said locking bolt has a proximal end and a distal end, wherein said distal end of said locking bolt in said extended position passes through said blocking opening and is received by said acceptance opening, and said distal end is tapered.

13. A device, according to claim 12, wherein said locking bolt, in said extended position, wedges against at least one edge of said blocking opening.

14. A device, according to claim 13, wherein the transverse section of said blocking opening is tapered.

15. A device, according to claim 14, wherein said tapered distal end of said locking bolt engages said tapered opening of said blocking opening.

16. A device, according to claim 8, further comprising an inertia sensitive control that triggers the locking bolt to slidably pass through the blocking opening and the acceptance opening.

* * * * *

UNITED STATES PATENT AND TRADEMARK OFFICE
CERTIFICATE OF CORRECTION

PATENT NO.   : 6,561,584 B1
DATED        : May 13, 2003
INVENTOR(S)  : Tobias Schwarz et al.

It is certified that error appears in the above-identified patent and that said Letters Patent is hereby corrected as shown below:

<u>Title page,</u>
Item [73], Assignee, please delete "Faurocia Autositze Gmbh & Co. KG." and insert the following: -- Faurecia Autositze Gmbh & Co. KG. --

Signed and Sealed this

Thirtieth Day of September, 2003

JAMES E. ROGAN
*Director of the United States Patent and Trademark Office*